United States Patent
Chuang et al.

(10) Patent No.: US 9,865,894 B2
(45) Date of Patent: Jan. 9, 2018

(54) SOLID OXIDE FUEL CELLS FUELED WITH REDUCIBLE OXIDES

(71) Applicants: Steven S. Chuang, Hudson, OH (US); Liang Shih Fan, Columbus, OH (US)

(72) Inventors: Steven S. Chuang, Hudson, OH (US); Liang Shih Fan, Columbus, OH (US)

(73) Assignees: The University of Akron, Akron, OH (US); The Ohio State University, Columbus, OH (US)

( * ) Notice: Subject to any disclaimer, the term of this patent is extended or adjusted under 35 U.S.C. 154(b) by 0 days.

(21) Appl. No.: 14/843,385

(22) Filed: Sep. 2, 2015

(65) Prior Publication Data
US 2016/0064742 A1 Mar. 3, 2016

Related U.S. Application Data

(60) Provisional application No. 62/044,463, filed on Sep. 2, 2014.

(51) Int. Cl.
| | |
|---|---|
| *H01M 8/18* | (2006.01) |
| *H01M 8/22* | (2006.01) |
| *H01M 8/1246* | (2016.01) |
| *H01M 8/06* | (2016.01) |
| *H01M 8/124* | (2016.01) |

(Continued)

(52) U.S. Cl.
CPC ........... *H01M 8/1246* (2013.01); *H01M 8/06* (2013.01); *H01M 8/18* (2013.01); *H01M 8/184* (2013.01); *H01M 8/225* (2013.01); *H01M 4/8889* (2013.01); *H01M 4/9066* (2013.01); *H01M 2008/1293* (2013.01); *Y02E 60/525* (2013.01); *Y02P 70/56* (2015.11)

(58) Field of Classification Search
None
See application file for complete search history.

(56) References Cited

U.S. PATENT DOCUMENTS

| | | | |
|---|---|---|---|
| 2012/0094217 A1* | 4/2012 | Watanabe | H01M 8/0252 429/523 |
| 2012/0171588 A1* | 7/2012 | Fan | C01B 3/063 429/418 |

(Continued)

*Primary Examiner* — Jonathan Crepeau
(74) *Attorney, Agent, or Firm* — Renner Kenner Greive Bobak Taylor & Weber

(57) ABSTRACT

A direct-electrochemical-oxidation fuel cell for generating electrical energy includes a cathode provided with an electrochemical-reduction catalyst that promotes formation of oxygen ions from an oxygen-containing source at the cathode, a solid-state reduced metal, a solid-state anode provided with an electrochemical-oxidation catalyst that promotes direct electrochemical oxidation of the solid-state reduced metal in the presence of the oxygen ions to produce electrical energy, and an electrolyte disposed to transmit the oxygen ions from the cathode to the solid-state anode. A method of operating a solid oxide fuel cell includes providing a direct-electrochemical-oxidation fuel cell comprising a solid-state reduced metal, oxidizing the solid-state reduced metal in the presence of oxygen ions through direct-electrochemical-oxidation to obtain a solid-state reducible metal oxide, and reducing the solid-state reducible metal oxide to obtain the solid-state reduced metal.

17 Claims, 5 Drawing Sheets

(51) Int. Cl.
   *H01M 4/88*      (2006.01)
   *H01M 4/90*      (2006.01)

(56) References Cited

U.S. PATENT DOCUMENTS

2014/0113201 A1* 4/2014 Becker ............... B22F 3/11
                                              429/235
2015/0044598 A1* 2/2015 Lee ............... H01M 4/9025
                                              429/503

* cited by examiner

SOLID OXIDE FUEL CELLS FUELED WITH REDUCIBLE OXIDES

CROSS-REFERENCE TO RELATED APPLICATIONS

The present application claims priority to U.S. Provisional Patent Application No. 62/044,463, filed Sep. 2, 2014, incorporated herein by reference.

GOVERNMENT RIGHTS

This invention was made with government support under grant FG36-06GO86055 from the Department of Energy. The government has certain rights in the invention.

FIELD OF THE INVENTION

The present invention relates to the generation of electrical energy from a solid-state reducible metal oxide. The present invention further relates to the use of a solid-state reducible metal oxide as a solid fuel in a solid oxide fuel cell. The present invention further relates to a direct-electro-chemical-oxidation fuel cell having a solid-state anode that promotes direct electrochemical oxidation of a solid-state reduced metal in the presence of oxygen ions to produce electrical energy and a solid-state reducible metal oxide; the solid-state reducible metal oxide can then be reduced back to the solid-state reduced metal.

BACKGROUND OF THE INVENTION

Conventional solid oxide fuel cells (SOFC) operate with gaseous fuels such as hydrogen and hydrocarbons. Producing, storing, and transporting hydrogen remains costly. Although hydrocarbon fuels are relatively low cost, the use of hydrocarbon fuels in a SOFC requires a number of complex steps such as partial oxidation or reforming with a sophisticated control scheme. Further, directly feeding hydrocarbon fuel to a SOFC has been shown to result in a gradual degradation of the anode of the fuel cell due to carbon deposition.

U.S. Pat. No. 8,940,454 discloses a direct-electrochemical-oxidation fuel cell that generates electrical energy using a solid-state organic fuel. However, certain of the solid fuels disclosed therein can cause dirty operating conditions or can include impurities. The use of those solid fuels can also lead to contamination of additional fuel used in the fuel cell.

Thus, a need remains in the art for an improved direct-electrochemical-oxidation fuel cell.

SUMMARY OF THE INVENTION

In a first embodiment, the present invention provides a direct-electrochemical-oxidation fuel cell for generating electrical energy comprising a cathode provided with an electrochemical-reduction catalyst that promotes formation of oxygen ions from an oxygen-containing source at the cathode; a solid-state reduced metal; a solid-state anode provided with an electrochemical-oxidation catalyst that promotes direct electrochemical oxidation of said solid-state reduced metal in the presence of the oxygen ions to produce electrical energy; and an electrolyte disposed to transmit the oxygen ions from the cathode to the solid-state anode.

In a second embodiment, the present invention provides a fuel cell as in the first embodiment, wherein electricity is generated by direct electrochemical oxidation at the solid-state anode according to the reaction:

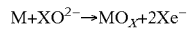

$$M + XO^{2-} \rightarrow MO_X + 2Xe^-$$

where M is the solid-state reduced metal and is a transition metal, where $MO_x$ is a solid-state reducible metal oxide, and where X is a number from 0.1 to 3.

In a third embodiment, the present invention provides a fuel cell as in either the first or second embodiment, wherein M is a metal selected from the group consisting of Fe, Cu, Co, Ni, Ag, Au, and alloys thereof.

In a fourth embodiment, the present invention provides a fuel cell as in any of the first through third embodiments, wherein M is Fe.

In a fifth embodiment, the present invention provides a fuel cell as in any of the first through fourth embodiments, wherein X is a number from 1 to 3.

In a sixth embodiment, the present invention provides a fuel cell as in any of the first through fifth embodiments, wherein said solid-state reduced metal is distributed in a ceramic particle, said ceramic particle being disposed in proximity to said solid-state anode.

In a seventh embodiment, the present invention provides a fuel cell as in any of the first through sixth embodiments, wherein said cathode comprises a cathode interlayer and a cathode current collector layer, and wherein said solid-state anode comprises an anode interlayer and an anode support layer.

In an eighth embodiment, the present invention provides a fuel cell as in any of the first through seventh embodiments, wherein said solid-state anode comprises an additional impregnation of a catalyst component, the additional impregnation being selected from the group consisting of Ba, Sc, Th, Y, Ce, Gd, Sm, La, Sr, Co, and Fe ions, and combinations thereof.

In a ninth embodiment, the present invention provides a method of operating a solid oxide fuel cell comprising the steps of providing a direct-electrochemical-oxidation fuel cell comprising a solid-state reduced metal; oxidizing the solid-state reduced metal in the presence of oxygen ions through direct-electrochemical-oxidation to obtain a solid-state reducible metal oxide; and reducing the solid-state reducible metal oxide to obtain the solid-state reduced metal.

In a tenth embodiment, the present invention provides a method as in the ninth embodiment, wherein the direct-electrochemical-oxidation fuel cell further comprises a cathode provided with an electrochemical-reduction catalyst that promotes formation of oxygen ions from an oxygen-containing source at the cathode; a solid-state anode provided with an electrochemical-oxidation catalyst that promotes direct electrochemical oxidation of the solid-state reduced metal in the presence of the oxygen ions to produce electrical energy; and an electrolyte disposed to transmit the oxygen ions from the cathode to the solid-state anode.

In an eleventh embodiment, the present invention provides a method as in either the ninth or tenth embodiment, further comprising the step of supplying the solid-state reducible metal oxide to an external reducer, wherein the step of reducing occurs in the external reducer.

In a twelfth embodiment, the present invention provides a method as in any of the ninth through eleventh embodiments, further comprising the step of providing the solid-state reduced metal to the direct-electrochemical-oxidation fuel cell after said step of reducing.

In a thirteenth embodiment, the present invention provides a method as in any of the ninth through twelfth embodiments, wherein said step of reducing occurs in the presence of a carbonaceous fuel.

In a fourteenth embodiment, the present invention provides a method as in any of the ninth through thirteenth embodiments, wherein said step of reducing occurs by supplying hydrogen to the solid-state reducible metal oxide.

In a fifteenth embodiment, the present invention provides a method as in any of the ninth through fourteenth embodiments, wherein said step of reducing occurs by supplying electrical energy to the direct-electrochemical-oxidation fuel cell.

In a sixteenth embodiment, the present invention provides a method as in any of the ninth through fifteenth embodiments, wherein the rate of direct-electrochemical-oxidation of the solid state reduced metal is accelerated by providing a catalyst on the surface of the anode.

In a seventeenth embodiment, the present invention provides a method as in any of the ninth through sixteenth embodiments, wherein the rate of direct-electrochemical-oxidation of the solid state reduced metal is accelerated by incorporating a catalyst with the solid state reduced metal.

In an eighteenth embodiment, the present invention provides a method of operating a solid oxide fuel cell comprising the steps of providing a direct-electrochemical-oxidation fuel cell having an anode, a cathode, and an electrolyte disposed between the anode and the cathode; providing a solid-state reducible metal oxide to the direct-electrochemical-oxidation fuel cell; and reducing the solid-state reducible metal oxide to obtain a solid-state reduced metal.

In a nineteenth embodiment, the present invention provides a method as in the eighteenth embodiment, wherein the step of providing a solid-state reducible metal oxide includes disposing a ceramic particle comprising the a solid-state reducible metal oxide proximate to the anode.

In a twentieth embodiment, the present invention provides a method as in either the eighteenth or nineteenth embodiment, wherein the step of providing a solid-state reducible metal oxide includes directly impregnating the anode with the solid-state reducible metal oxide.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

Figure 1:
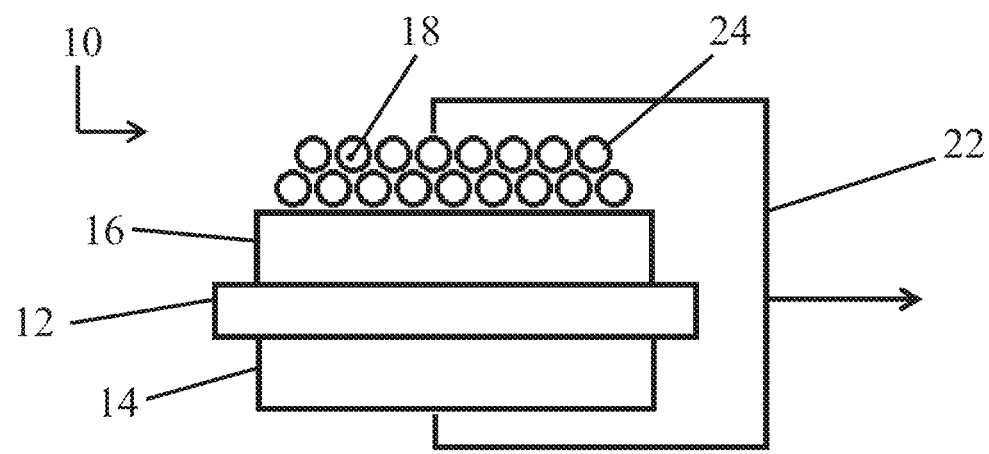
FIG. 1 is a schematic of a solid oxide fuel cell comprising a solid-state reduced metal.
Figure 2:
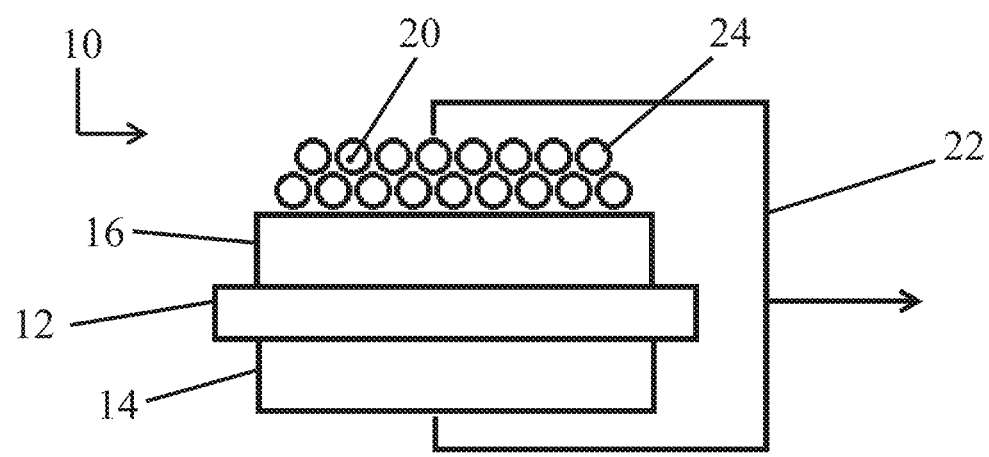
FIG. 2 is a schematic of a solid oxide fuel cell after a solid-state reduced metal has been oxidized to a solid-state reducible metal oxide.
Figure 3:
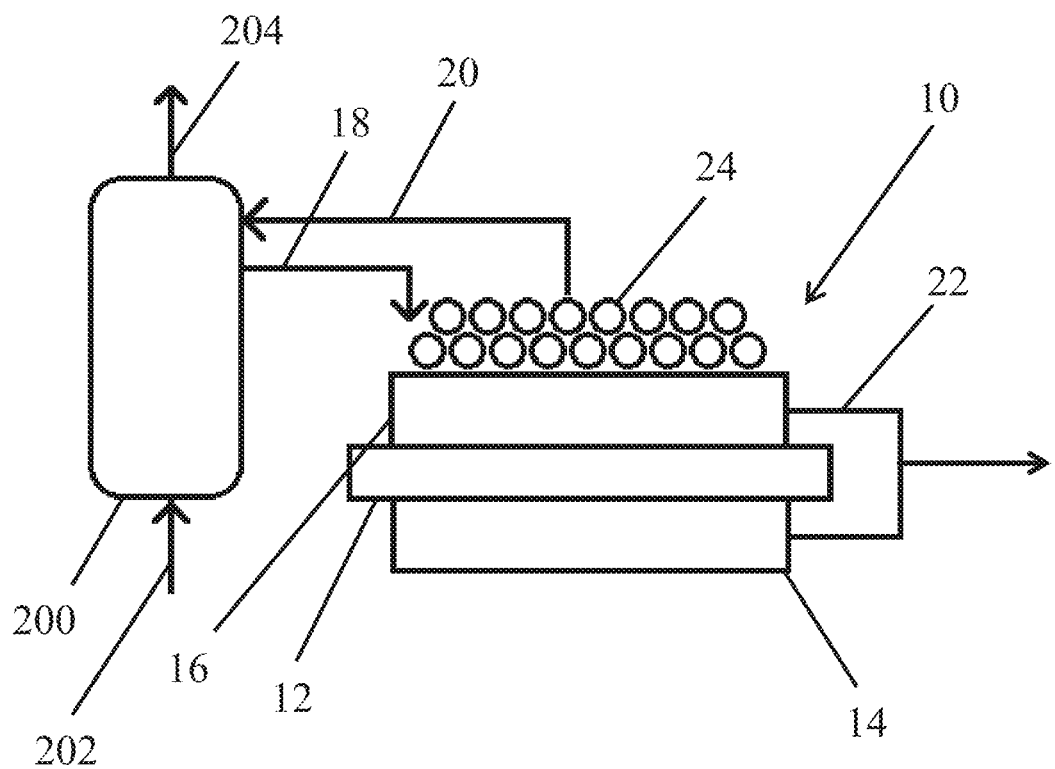
FIG. 3 is a schematic of a solid oxide fuel cell provided with an external reducer to reduce solid-state reducible metal oxide to solid-state reduced metal.
Figure 4:
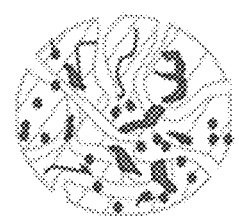
FIG. 4 is a schematic of a ceramic particle capable of conducting both electrons and oxygen anions.
Figure 5:
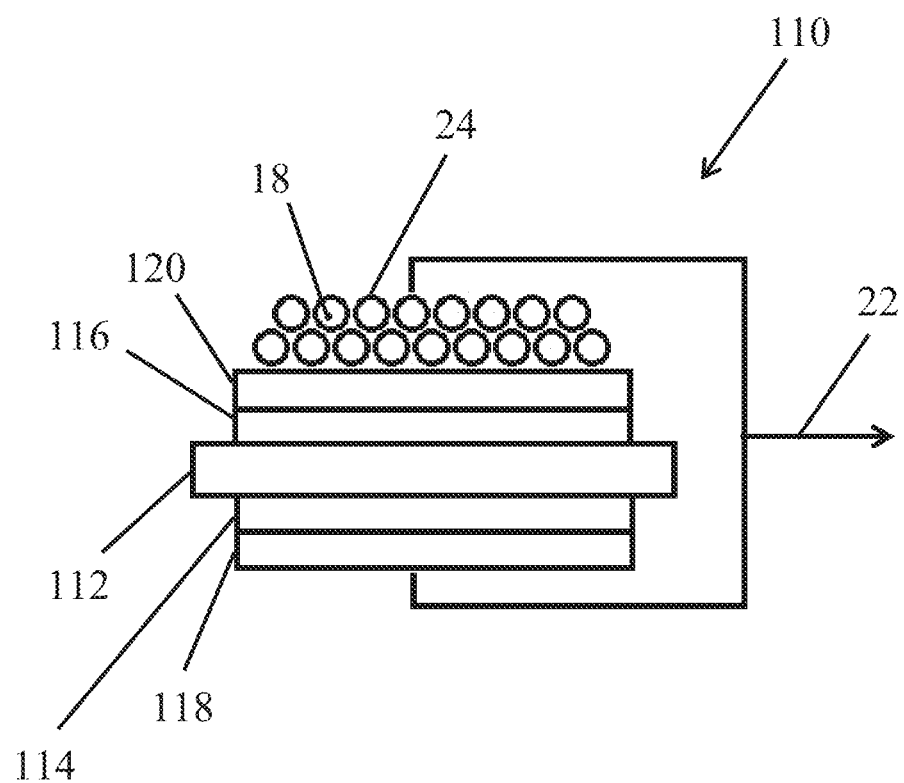
FIG. 5 is a schematic of a solid oxide fuel cell comprising an anode support layer, anode interlayer, cathode interlayer, and cathode current collector.
Figure 6:
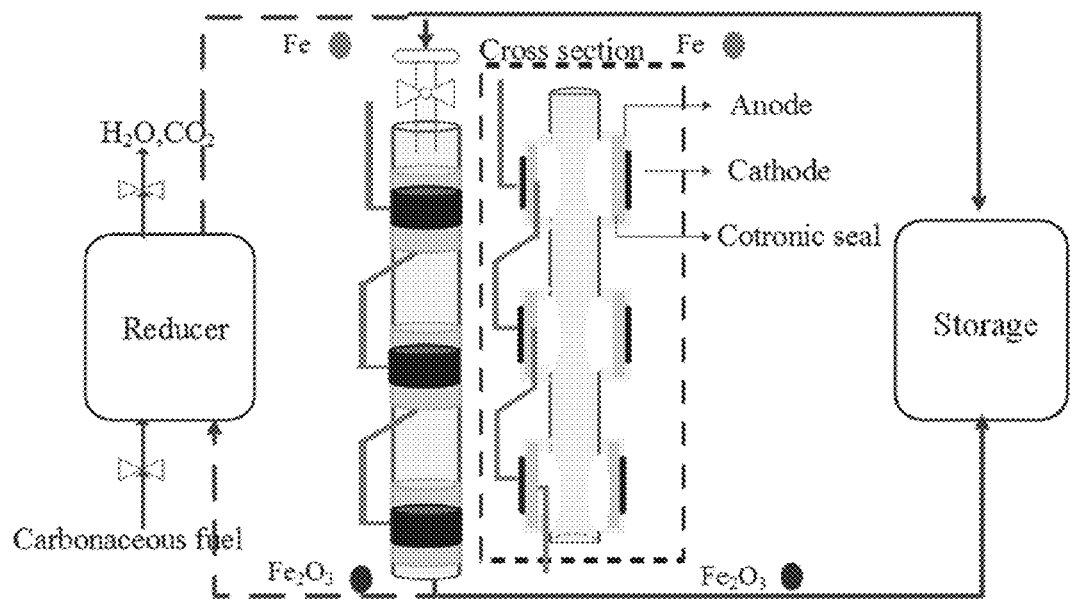
FIG. 6 is a schematic of a solid oxide fuel cell system having an external reducer.

Embodiments of the invention relate to a solid oxide fuel cell comprising a solid-state reducible metal oxide as a solid fuel. In one or more embodiments, a direct-electrochemical-oxidation fuel cell comprises a cathode that promotes formation of oxygen ions from an oxygen-containing source, a solid-state anode that promotes direct electrochemical oxidation of a solid-state reduced metal in the presence of the oxygen ions to produce electrical energy and a solid-state reducible metal oxide, and an electrolyte capable of transmitting the oxygen ions from the cathode to the anode. In one or more embodiments, the solid-state reducible metal oxide can then be reduced back to the solid-state reduced metal. In one or more embodiments, the solid-state anode is capable of conducting both oxygen anions and electrons and catalyzing the electrochemical oxidation of reducible metal oxides.

While certain conventional definitions of the term "solid oxide fuel cell" employ either gaseous or liquid fuels, it should be appreciated that the present invention employs a solid fuel for the fuel cell. In one or more embodiments, a supplemental fuel is used in addition to the solid fuel, where the supplemental fuel is used to reduce the solid fuel. The reduction is from a solid-state reducible metal oxide to a solid-state reduced metal.

A direct electrochemical-oxidation, solid-oxide fuel cell 10 includes an electrolyte 12 disposed between a cathode 14 and an anode 16. Cathode 14 is provided with an electro-chemical-reduction catalyst that promotes formation of oxygen ions from an oxygen-containing source at the cathode 14. Anode 16 is provided with an electrochemical oxidation catalyst that promotes direct electrochemical oxidation of a solid-state reduced metal 18 in the presence of oxygen ions to produce electrical energy and a solid-state reducible metal oxide 20, where the produced electrical energy can be collected by an electrical circuit 22. Electrolyte 12 is a solid electrolyte membrane capable of transmitting oxygen ions thereacross from cathode 14 to anode 16.

As used herein, electrochemical oxidation is defined as the oxidation resulting in the transmission of one or more free electrons through an external electrical circuit. Conventional oxidation, in contrast, is merely an increase in the oxidation number of the material being oxidized, regardless of the transmission of a free electron through external circuits.

Cathode 14 includes an electrochemical-reduction catalyst, which can also be referred to as the cathode catalyst, that promotes formation of oxygen ions from an oxygen-containing source according to the electrochemical-reduction reaction:

$$O_2 + 4e^- \rightarrow 2O^{2-}$$

The cathode catalyst catalyzes the electrochemical-reduction reaction that takes place at cathode 14.

The oxygen-containing source can be any fluid, such as air, that includes oxygen that can be reduced to $O^{2-}$ in the presence of the cathode catalyst. Cathode 14 is capable of conducting both oxygen ions and electrons and can therefore be referred to as a mixed ionic-and-electronic, electrically-conductive material.

Cathode 14, according to one or more embodiments of the invention, can be a mixed ionic-and-electronic conducting oxide which is a composite of ionic-conducting electrolyte and cathode catalyst. Cathode catalysts can be Lanthanum Strontium Manganese Oxide, having the symbol $La_{0.95}Sr_{0.05}MnO_3$ (LSMO), Lanthanum Strontium Ferrite, having the symbol $La_{0.8}Sr_{0.2}FeO_3$ (LSF), Lanthanum Strontium Cobalt Ferrite, having the symbol $La_{0.6}Sr_{0.4}Fe_{0.8}Co_{0.2}O_3$ (LSCF), and Samaria Strontium Cobalt Oxide, having the symbol $Sm_{0.5}Sr_{0.5}CoO_3$ (SSC), for example. Other perovskites suitable to be provided to the cathode catalyst include $YBa_2Cu_3O_y$, wherein y is an integer having values within a range of 7-9; $La_{0.99}MnO_3$; $LaMnO_3$; $La_xSr_yMn_3$ and $La_xCa_yMnO_3$, wherein x is a number having values within a range of 0.6-0.95, and y is a number having values within a range of 0.1-0.4; and any other material having a general formula of $A_xB_yO_3$, wherein A is selected from the group consisting of La, Gd, Sm, Nd, Pr, Tb and Sr, B is selected from the group consisting of Mn, Fe, Ga, Cr, Ti, Ce, and Co, x is a number having values within a range of 0.6-0.95, and y is a number having values within a range of 0.1-0.4. Materials other than mixed conducting oxides, such as Ag, are also suitable for forming the cathode catalyst of the present invention.

Solid electrolyte 12 is disposed between cathode 14 and anode 16 to transport oxygen ions from cathode 14 to anode 16. The solid electrolyte 12 is the medium which provides the oxygen anion $O^{2-}$ ion-transport mechanism between cathode 14 and anode 16. Current flow via electrolyte 12 is due to the movement of ions instead of the movement of electrons as in conventional current flow. Cathode 14 and anode 16 are coupled to opposing surfaces of electrolyte 12.

Suitable electrolytes 12 can be formed from doped oxides of Bi, Zr, Hf, Th, and Ce with either alkaline earth oxides such as CaO or MgO, or rare-earth oxides such as $Sc_2O_3$, $Y_2O_3$, $Yb_2O_3$. Suitable electrolytes 12 can also be formed from $Bi_2O_2$, $(Bi_2O_7)_{0.75}(Y_2O_3)_{0.25}$, $BaTh_{0.9}Gd_{0.1}O_3$, $La_{0.8}Sr_{0.2}Ga_{0.8}Mg_{0.2}O_3$, $(Ce_2)_{0.8}(GdO_{0.5})_{0.2}$, $(ZrO_2)_{0.9}(Sc_2O_3)_{0.1}$, $(ZrO_2)_{0.9}(Y_2O_3)_{0.1}$, $(ZrO_2)_{0.87}(CaO)_{0.13}$, $(La_2O_3)_{0.95}(SrO)_{0.05}$, and $La_{0.8}Sr_{0.2}Ga_{0.8}Mg_{0.2}O_{3-\delta}$ (LSGM). Other suitable electrolytes 12 include $Dy_{0.08}W_{0.04}Bi_{0.88}O_{1.56}$, $Er_{0.4}Bi_{1.6}O_3$, $Gd_{0.1}Ce_{0.9}O_{1.95}$, $SNDC-Sm_{0.075}Nd_{0.075}Ce_{0.85}O_{2-\delta}$, and stabilized zirconia $(YSZ-Y_{0.16}Zr_{0.92}O_{2.08})$.

Similar to cathode 14, anode 16 is capable of conducting both oxygen ions and electrons and can therefore also be referred to as a mixed ionic-and-electronic, electrically-conductive material. Anode 16 can be a composite of ionic conducting electrolyte and anode catalyst. Anode 16 comprises an electrochemical-oxidation catalyst the promotes direct electrochemical oxidation of the solid-state reduced metal 18 in the presence of the oxygen ions generated at the cathode 12 to produce electrical energy. The electrochemical-oxidation catalyst can also be referred to as the anode catalyst.

The ionic conducting electrolyte of the cathode 14 and anode 16 can be selected from the group consisting of from doped oxides of Bi, Zr, Hf, Th, and Ce with either alkaline earth oxides such as CaO or MgO, rare-earth oxides such as $Sc_2O_3$, $Y_2O_3$, $Yb_2O_3$, $Bi_2O_2$, $(Bi_2O_7)_{0.25}(Y_2O_3)_{0.25}$, $BaTh_{0.9}Gd_{0.1}O_3$, $La_{0.8}Sr_{0.2}Ga_{0.8}Mg_{0.2}O_3$, $(Ce_2)_{0.8}(GdO_{0.5})_{0.2}$, $(ZrO_2)_{0.9}(Sc_2O_3)_{0.1}$, $(ZrO_2)_{0.9}(Y_2O_3)_{0.1}$, $(ZrO_2)_{0.87}(CaO)_{0.13}$, $(La_2O_3)_{0.95}(SrO)_{0.05}$, and $La_{0.8}Sr_{0.2}Ga_{0.8}Mg_{0.2}O_{3-\delta}$(LSGM).

The anode catalyst can be a noble metal, group VIII metal/metal oxide, such as Pt, Cu, Ag, Au, Pd, and oxides of Ce, Cr, Fe, and Pb, and combinations thereof. The anode catalyst can also be a combination of multiple oxides, such as $Fe-TiO_2$. Other suitable anode catalysts include perovskites, $La_{1-x}Sr_xCr_{1-y}M_yO_3$ (where M=Fe, Co, Ni, or Mn), SrTiO3, and LSCF ($La_{1-x}Sr_xCo_{1-y}Fe_yO_3$). Another suitable anode catalyst is NiO/YSZ, where YSZ represents Yttria-stabilized zirconia, a ceramic known to those skilled in the art. Other suitable anode catalysts include $(La_{0.6}Sr_{0.4})_{1-x}Co_{0.2}Fe_{0.8}O_{3-\delta}$, where x is selected from 0, 0.02, 0.05, and 0.10, $La_{0.6}Sr_{0.4-x}C_{0.2}Fe_{0.8}O_{3-\delta}$, where x is selected from 0, 0.02, 0.05, and 0.10, $Sm_{0.5}Sr_{0.5}CO_8O_{3-\delta}$(SSC), $YBa_2Cu_3O_y$, wherein y is an integer having values within a range of 7-9, $La_{0.99}MnO_3$, $LaMnO_3$, $La_xSr_yMn_3$, and $La_xCa_yMnO_3$, wherein x is a number within a range of 0.6-0.95, and y is a number within a range of 0.1-0.4.

The anode catalyst is a highly-active oxidizing catalyst that promotes the direct and substantially-complete electrochemical oxidation of the solid-state reduced metal 18 at anode 14 within the operating temperature of fuel cell 10, without requiring gasification of solid-state reduced metal 18 before performing the electrochemical oxidation thereof.

The anode catalyst allows direct electrochemical oxidation of the solid-state reduced metal according to the reaction:

$$M + XO^{2-} \rightarrow MO_X + 2Xe^-$$

where M is a solid-state reduced metal that forms the solid-state reducible metal oxide, $MO_x$, thereof, and where X is a number from 0.1 to 3. In one or more embodiments, M is a metal selected from the group consisting of Fe, Cu, Co, Ni, Ag, Au, and alloys thereof. In one or more embodiments, M is a metal selected from other group VIII elements and their alloys. In one or more embodiments, X is a number from 1 to 3. In one or more embodiments, X is 1. In one or more embodiments, X is 2. In one or more embodiments, X is 3.

In one or more embodiments, anode 16 includes one or more ceramic particles 24 disposed in proximity thereto, where ceramic particles 24 comprise solid-state reduced metal 18. In one or more embodiments, ceramic particles 24 are impregnated with solid-state reduced metal 18. In one or more embodiments, solid-state reduced metal 18 is embedded in ceramic particles 24. In one or more embodiments, solid-state reducible metal oxide 20 is embedded in ceramic particles 24.

In one or more embodiments, anode 16 is directly impregnated with solid-state reduced metal 18. In one or more embodiments, anode 16 is directly impregnated with solid-state reducible metal oxide 20.

Solid-state reduced metal 18 can be any metal having a propensity for oxidation and that will oxidize in the presence of oxygen ions to form solid-state reducible metal oxide 20. Solid-state reducible metal oxide 20 includes the metal element of solid-state reduced metal 18 having an oxidation state lower than the oxidation state as solid-state reduced metal 18. For example, $Fe_2O_3$ can be reduced to Fe with an oxidation state of zero or $Fe_3O_4$ with an oxidation state of 8/3.

Solid-state reduced metal 18 can be selected from any of the transition metals. Particular metals suitable as solid-state reduced metal 18 include Fe, Cu, Co, Ni, Ag, Au, and alloys thereof. Other metals suitable as solid-state reduced metal 18 include other group VIII elements and their alloys.

Solid-state reducible metal oxide 20 can be selected from oxides of any of the transition metals. Other suitable materials for solid-state reducible metal oxide 20 include oxides of Fe, Cu, Co, Ni, Ag, Au, and oxides of alloys thereof. Particular metal oxides suitable as solid-state reducible metal oxide 20 include $Fe_2O_3$, CuO, $Co_3O_4$, and NiO.

In one or more embodiments, solid-state reduced metal 18 is embedded within a ceramic particle 24. In one or more embodiments, solid-state reducible metal oxide 20 is embedded within a ceramic particle 24. In one or more embodiments, it can be said that solid-state reduced metal 18 is distributed in a ceramic particle 24. Suitable ceramics for ceramic particle 24 include oxides of Ti, Fe, Mo, Si, and Al.

The ceramic particles can be characterized by an average particle size. In one or more embodiments, the average particle size of the ceramic particles is in a range of from 1 micrometer to 5 cm. In one or more embodiments, the average particle size of the ceramic particles is in a range of from 0.1 mm to 5 mm. In one or more embodiments, the average particle size of the ceramic particles is in a range of from 1 mm to 5 mm.

The ceramic particles can be characterized by porosity. In one or more embodiments, the porosity of the ceramic particles is in a range of from 0.001 to 0.5. In one or more embodiments, the porosity of the ceramic particles is in a range of from 0.001 to 0.1. In one or more embodiments, the porosity of the ceramic particles is in a range of from 0.01 to 0.1.

Advantageously, one or more embodiments of the present invention provide ceramic particles capable of carrying out electrochemical oxidation without fouling the anode surface. More particularly, the ceramic particles exhibit high mechanical strength, such that the reduced form of the pellets may be electrochemically oxidized on the anode of a solid oxide fuel cell without causing fouling the anode surface.

The manufacture of fuel cells is generally known to those skilled in the art. Particularly, the manufacture of anodes, electrolytes, and cathodes is generally known to those skilled in the art. In one or more embodiments, titania supported iron oxide ($Fe_2O_3/TiO_2$) as a solid fuel can be prepared using a sol-gel synthesis method as disclosed in the reference article, "Syngas chemical looping gasification process: Oxygen carrier particle selection and performance" to Li, et al. from *Energy & Fuels* 2009, volume 23, pages 4182-4189, which is incorporated herein by reference.

Advantageously, one or more embodiments of the present invention include anode triple phase boundaries that are smaller than conventional fuel cells. As the skilled person appreciates, a triple phase boundary, which can be characterized by a volumetric length, is a reaction site where ions, electrons, and a chemical species of a fuel meet to carry out the electrochemical reaction. In one or more embodiments, Fe/Ti oxide ($Fe_xTi_yO_z$, a mixed oxide of Fe and Ti) is used as a solid fuel for a fuel cell and has a volumetric triple phase boundary length that is smaller than when hydrogen is used as the fuel for oxidation.

Electrical circuit 22 and electrical circuit 122 are generally known to those skilled in the art. The circuit provides a path for electrons to flow through. A circuit may include further components known to those skilled in the art, such as load cells, resistors, and capacitors.

In one or more embodiments, cathode 14 and anode 16, along with their respective catalysts, can be applied to a pre-formed electrolyte 12 by forming a cathode paste and an anode paste. The cathode paste comprises the cathode catalyst and the anode paste comprises the anode catalyst. Each paste is then applied as a film onto the respective surface of electrolyte 12 to facilitate the transfer of oxygen ions from cathode 14 to anode 16. Any conventional coating technique can be employed to apply the cathode and anode pastes to the surfaces of electrolyte 12.

A fuel cell 10 can also be made using a tape casting and screen printing method as disclosed in the reference article "$La_{0.6}Sr_{0.4}CO_{0.2}Fe_{0.8}O_3$ perovskite: A stable anode catalyst for direct methane solid oxide fuel cells" by Mirzababaei, J. and Chuang, S. from *Catalysts*, 2014, volume 4, pages 146-161, which is incorporated herein by reference.

The thickness of cathode 14 and anode 16 applied to electrolyte 12 must be balanced along with the thickness of electrolyte 12 to ensure that forces exerted on each material from the expansion experienced by each within the operating temperature range of fuel cell 10 does not cause fractures in adjacent materials. Obtaining the suitable thickness of each material can be accomplished by sound engineering judgment by one of ordinary skill in the art. As used herein, the term thickness refers to the dimensions of the material in a direction perpendicular to the primary planar surface forming an interface between the electrodes and the electrolyte.

In one or more embodiments, the thickness of electrolyte 12 is in a range of from 1 micrometer to 5 mm. In one or more embodiments, the thickness of electrolyte 12 is in a range of from 5 micrometer to 200 micrometer.

In one or more embodiments, the thickness of cathode 14 is in a range of from 5 micrometer to 200 micrometer. In one or more embodiments, the thickness of cathode 14 is in a range of from 20 micrometer to 80 micrometer.

In one or more embodiments, the thickness of anode 16 is in a range of from 20 micrometer to 1 cm. In one or more embodiments, the thickness of anode 16 is in a range of from 20 micrometer to 2 mm. In one or more embodiments, the thickness of anode 16 is in a range of from 20 micrometer to 80 micrometer.

Fuel cell 10 can be characterized by the operating temperature thereof. In one or more embodiments, the operating temperature of fuel cell 10 is in a range of from 500° C. to 1100° C. In one or more embodiments, the operating temperature of fuel cell 10 is in a range of from 550° C. to 850° C.

The operating temperature of fuel cell 10 or fuel cell 110 may be based on the material that is utilized to conduct electric energy to and from the fuel cell. Examples of suitable electric-energy-conducting materials include Pt for temperatures less than about 1000° C., Cu for temperatures less than about 850° C., Ni for temperatures less than about 850° C., Ag for temperatures less than about 600° C., and stainless steel for temperatures less than about 750° C. Other suitable electric-energy-conducting materials include metal alloys and electronic conducting oxides.

In one or more embodiments, a direct electrochemical-oxidation, solid-oxide fuel cell 110 includes an electrolyte 112 disposed between a cathode interlayer 114 and an anode interlayer 116. Cathode interlayer 114 is disposed between electrolyte 112 and a cathode current collector layer 118. Anode interlayer 116 is disposed between electrolyte 112 and an anode support layer 120.

Cathode current collector layer 118 and cathode interlayer 114 promote formation of oxygen ions from an oxygen-containing source. An electrochemical-reduction catalyst is provided and incorporated into either cathode current collector layer 118 or cathode interlayer 114, or both cathode current collector layer 118 and cathode interlayer 114. Anode support layer 120 is provided with an electrochemical oxidation catalyst that promotes direct electrochemical oxidation of a solid-state reduced metal 18 in the presence of oxygen ions to produce electrical energy and a solid-state reducible metal oxide 20, where the produced electrical energy can be collected by an electrical circuit 122. Electrolyte 112 is a solid electrolyte membrane capable of transmitting oxygen ions thereacross from cathode interlayer 114 to anode interlayer 116.

Suitable materials for cathode current collector layer 118 and cathode interlayer 114 include those listed above for cathode 14. Suitable materials for cathode anode support layer 120 and anode interlayer 116 include those listed above for anode 16. Suitable materials for electrolyte 112 include those listed above for electrolyte 12.

In one or more embodiments, cathode interlayer 114 and anode interlayer 116 can be applied to a pre-formed electrolyte 112 by forming a cathode paste and an anode paste. Each paste is then applied as a film onto the respective surface of electrolyte 112. Cathode current collector layer 118 can then be applied to cathode interlayer 114 and anode support layer 120 can be applied to anode interlayer 116. Any conventional coating technique can be employed to apply the pastes to the respective surfaces.

A fuel cell 110 can also be made using a tape casting and screen printing method as disclosed in the reference article "$La_{0.6}Sr_{0.4}CO_{0.2}Fe_{0.8}O_3$ perovskite: A stable anode catalyst for direct methane solid oxide fuel cells" by Mirzababaei, J. and Chuang, S. from Catalysts, 2014, volume 4, pages 146-161, which is incorporated herein by reference.

Electrolyte 12, cathode 14, anode 16, electrolyte 112, cathode interlayer 114, anode interlayer 116, cathode current collector layer 118, and anode support layer 120 can be characterized by porosity. In one or more embodiments, the porosity is in a range of from 0.001 to 0.5. In one or more embodiments, the porosity is in a range of from 0.001 to 0.1. In one or more embodiments, the porosity is in a range of from 0.01 to 0.1.

The thicknesses of electrolyte 112, cathode interlayer 114, anode interlayer 116, cathode current collector layer 118, and anode support layer 120 must be balanced to ensure that forces exerted on each material from the expansion experienced by each within the operating temperature range of fuel cell 110 does not cause fractures in adjacent materials. Obtaining the suitable thickness of each material can be accomplished by sound engineering judgment by one of ordinary skill in the art. As used herein, the term thickness refers to the dimensions of the material in a direction perpendicular to the primary planar surface forming an interface between the electrodes and the electrolyte.

In one or more embodiments, the thickness of electrolyte 112 is in a range of from 1 micrometer to 5 mm. In one or more embodiments, the thickness of electrolyte 112 is in a range of from 5 micrometer to 200 micrometer.

In one or more embodiments, the thickness of cathode interlayer 114 is in a range of from 5 micrometer to 200 micrometer. In one or more embodiments, the thickness of cathode interlayer 114 is in a range of from 20 micrometer to 80 micrometer.

In one or more embodiments, the thickness of anode interlayer 116 is in a range of from 20 micrometer to 1 cm. In one or more embodiments, the thickness of anode interlayer 116 is in a range of from 20 micrometer to 2 mm. In one or more embodiments, the thickness of anode interlayer 116 is in a range of from 20 micrometer to 80 micrometer.

In one or more embodiments, the thickness of cathode current collector layer 118 is in a range of from 5 micrometer to 200 micrometer. In one or more embodiments, the thickness of cathode current collector layer 118 is in a range of from 20 micrometer to 80 micrometer.

In one or more embodiments, the thickness of anode support layer 120 is in a range of from 20 micrometer to 1 cm. In one or more embodiments, the thickness of anode support layer 120 is in a range of from 20 micrometer to 2 mm. In one or more embodiments, the thickness of anode support layer 120 is in a range of from 20 micrometer to 80 micrometer.

Fuel cell 110 can be characterized by the operating temperature thereof. In one or more embodiments, the operating temperature of fuel cell 110 is in a range of from 500° C. to 1100° C. In one or more embodiments, the operating temperature of fuel cell 110 is in a range of from 550° C. to 850° C.

In one or more embodiments, anode support layer 120 includes one or more ceramic particles 24 disposed in proximity thereto, where ceramic particles 24 comprise solid-state reduced metal 18. As discussed above, in one or more embodiments, ceramic particles 24 are impregnated with solid-state reduced metal 18. In one or more embodiments, solid-state reduced metal 18 is embedded in ceramic particles 24. In one or more embodiments, solid-state reducible metal oxide 20 is embedded in ceramic particles 24.

In one or more embodiments, anode interlayer 116 and anode support layer 120 can be directly impregnated with solid-state reduced metal 18. In one or more embodiments, anode interlayer 116 and anode support layer 120 can be directly impregnated with solid-state reducible metal oxide 20.

In one or more embodiments, a solid-oxide fuel cell is devoid of a solid-state organic fuel. In one or more embodiments, a solid-oxide fuel cell is devoid of a carbon-based fuel. In one or more embodiments, a solid-oxide fuel cell is devoid of carbon.

Embodiments of the present invention provide anodes that are lower porosity or non-porous. In these embodiments, an additional impregnation is provided to the pores of an anode catalyst. This additional impregnation can be selected from the group consisting of Ba, Sc, Th, Y, Ce, Gd, Sm, La, Sr, Co, and Fe ions, and combinations thereof, and will fill in pores of the anode catalyst. Where present, it can be said that this additional impregnation is an additional catalyst component. In one or more embodiments, these metal ions can be chelated with an amine functional group in organic amine and then impregnated on the porous anode structure. These low porosity or nonporous anodes can give high surface density of active sites for contacting with a ceramic particle comprising a reducible metal oxide. The resulting metal oxides from these metal ions will form a mixed conducting phase, capable of conducting both electrons and oxygen anions.

Advantageously, one or more embodiments of the present invention provide anodes capable of conducting both electrons and oxygen anions. In one or more embodiments, an anode comprises a material capable of conducting both electrons and oxygen anions. In one or more embodiments, an anode comprises a first material and a second material, where the first material is capable of conducting electrons and the second material is capable of conducting oxygen anions. These embodiments may be described as comprising mixed conducting phases.

In one or more embodiments, a ceramic particle comprises Fe—$TiO_2$ and the particle is further impregnated with a material that conducts both electrons and oxygen anions. In particular embodiments, this material that conducts both electrons and oxygen anions is perovskite, LSCF (Lanthanum Strontium Cobalt Ferrite). The further impregnation of a particle can be provided to further enhance the power density of a fuel cell system. In these embodiments, the $TiO_2$ imparts mechanical strength and attrition resistance to the particle, the material that conducts both electrons and oxygen anions provides the conductive pathway for both electrons and oxygen anions, and the LSCF provides stability under both oxidizing and reducing conditions.

In a method of operating a fuel cell, a fuel cell can be initially provided with a solid-state reducible metal oxide on the anode side. The solid-state reducible metal oxide can then be reduced to a solid-state reduced metal, such as by adding hydrogen gas to the solid-state reducible metal oxide. An oxygen-containing source can then be provided to the cathode side of the fuel cell. Upon reaching a suitable temperature, in the range of from 500° C. to 1100° C., the oxygen in the oxygen-containing source is converted to oxygen ions, which are then capable of diffusing from the cathode, across an electrolyte, and to the anode. The high temperature is maintained to promote diffusion of the oxygen ions. When the oxygen ions reach the anode, the solid-state reduced metal reacts with the oxygen ions to produce electrical energy and a solid-state reducible metal oxide. The electrical energy is then collected by an electrical circuit.

To continue the operation of the fuel cell following the reaction of solid-state reduced metal to solid-state reducible metal oxide, the solid-state reducible metal oxide must be converted back to the solid-state reduced metal.

In one or more embodiments, solid-state reducible metal oxide is converted to solid-state reduced metal by way of an external reducer. Following initiation of fuel cell 10, which reacts solid-state reduced metal 18 with oxygen ions to produce electrical energy and solid-state reducible metal oxide 20, solid-state reducible metal oxide 20 is supplied to external reducer 200. A carbonaceous fuel 202 is then supplied to external reducer 200 to convert solid-state reducible metal oxide 20 to solid-state reduced metal 18 and byproducts 204 of water and carbon dioxide. Examples of suitable carbonaceous fuel 202 include coal, natural gas, hydrogen, gasoline, diesel, jet fuel, coke, and biomass.

Following the reaction to solid-state reduced metal 18, solid-state reduced metal 18 is supplied back to the anode 16 of fuel cell 10. Solid-state reduced metal 18 can then again be reacted with oxygen ions to produce electrical energy and solid-state reducible metal oxide 20, and the method can be continued. Thus, the use of external reducer 200 allows for a continuous process for the operation of a fuel cell. External reducer 200 can also be utilized in a semi-continuous process for the operation of a fuel cell. Such a method can also be described as chemical looping.

In one or more embodiments, external reducer 200 is a vessel. In one or more embodiments, external reducer 200 includes one or more internal beds of solid-state reducible metal oxide 20. In one or more embodiments, external reducer 200 includes one or more internal beds of solid-state reduced metal 18. In one or more embodiments, external reducer 200 includes a plurality of stages for converting solid-state reducible metal oxide 20 to solid-state reduced metal 18. Other details of external reducer 200 are generally known to those skilled in the art. For example, external reducer 200 may be provided with trays, cyclones, and valves, and other components generally known to those skilled in the art.

In one or more embodiments, solid-state reducible metal oxide is converted to solid-state reduced metal by supplying a supplemental fuel to the solid-state reducible metal oxide. In one or more embodiments, the supplemental fuel is hydrogen. The supplemental fuel, such as hydrogen, is supplied to the solid-state reducible metal oxide 20. The supplemental fuel reacts with solid-state reducible metal oxide 20 to produce solid-state reduced metal 18 and water. In one or more embodiments, the supplemental fuel can be provided with a non-reactive, tracing gas, such as argon, for monitoring the flow pattern of the supplemental fuel.

In one or more embodiments, solid-state reducible metal oxide is converted to solid-state reduced metal by supplying electrical energy to the solid-state reducible metal oxide. The electrical energy, in the form of electrons, reacts with the solid-state reducible metal oxide to produce solid-state reduced metal. The electrical energy flows from the cathode to the anode and the oxygen ions flow from the anode to the cathode.

Thus, in one or more embodiments, a solid oxide fuel cell comprising solid-state reducible metal oxide can be used as a rechargeable battery. Reducible metal oxide inside a solid oxide fuel cell can be reduced by applying external voltage to reverse the direction of flow of the oxygen anions. The applied external voltage will reduce the solid-state reducible metal oxide back to the metal.

As should be appreciated from the above, one or more embodiments of the present invention provide a fuel cell capable of balancing the load of an electric grid. During the "off peak" timeframe, a fuel cell as described herein can be configured as to store the excess electric power being supplied by an electric grid. Then, a fuel cell as described herein can be configured as to release the stored energy back to the electric grid during the "peak demand" timeframe.

In light of the foregoing, it should be appreciated that the present invention significantly advances the art by providing an improved direct-electrochemical-oxidation fuel cell and associated methods of use. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Table 1 lists the open circuit voltage that can be produced from electrochemical oxidation of various reduced metal oxides.

TABLE 1

Open circuit voltage for various reduced metal oxides

|  | n | $-\Delta G = nFE$ (kJ/mol) 700° C. | 800° C. | E (V) 700° C. | 800° C. |
|---|---|---|---|---|---|
| $2Ni + O_2 \rightarrow 2NiO$ | 4 | 310 | 290 | 0.803 | 0.751 |
| $4Cu + O_2 \rightarrow 2Cu_2O$ | 4 | 220 | 200 | 0.570 | 0.518 |
| $4/3Fe + O_2 \rightarrow 2/3Fe_2O_3$ | 4 | 407 | 384 | 1.053 | 0.996 |
| $2Fe + O_2 \rightarrow 2FeO$ | 4 | 405 | 390 | 1.049 | 1.010 |
| $3/2Fe + O_2 \rightarrow 1/2Fe_3O_4$ | 4 | 405 | 390 | 1.049 | 1.010 |
| $2H_2 + O_2 \rightarrow 2H_2O$ (l) | 4 | 418 | 408 | 1.082 | 1.055 |

An Fe-based particle was chosen for the examples based on its high energy density the ability to fabricate a porous electric conductive pellet with high mechanical strength and attrition resistance.

Table 2 lists the Energy density of certain fuels.

TABLE 2

Energy densities

| Fuel | Energy Density (MJ/m$^3$) |
|---|---|
| $H_2$ (1 atm, 25° C.) | 12 |
| Coal | 20,400 |
| Iron to iron (II) oxide | 39,370 |
| Iron to iron (III) oxide | 55,120 |

Fe/Ti Oxide Preparation

Titania supported iron oxide ($Fe_2O_3/TiO_2$) was prepared using a sol-gel synthesis method. A solution of 1 g/mL of $FeCl_3 \cdot 6H_2O$ in isopropyl alcohol was mixed with a solution of 1:1 v/v aluminum isopropoxide (Alfa Aesar) in isopropyl alcohol. The mixture was heated to 50° C. to form a gel. The gel was dried under vacuum at 50° C. The dried gel was then calcined at 500-600° C. in a muffle furnace for 2 h in air. The resulting powder containing 70 wt % $Fe_2O_3$ was pressed into cylindrical pellets with 5 mm diameter and 1.5-4.5 mm height using a single-punch tablet press. The pellets were sintered at 900° C. for 12 h.

Fe/Ti Oxide Characterization

A sealed Diffuse Reflectance Infrared Fourier Transform Spectroscopy (DRIFTS) reactor cell was used for TPR (temperature-programmed reduction) and TPO (temperature-programmed oxidation) of 200 mg Fe/Ti oxide. Temperature was increased from room temperature to 800° C. at a heating rate of 20° C./min under Ar/H$_2$ (20 sccm, 50 vol % H$_2$) and Ar/O$_2$ (20 sccm, 50 vol % O$_2$) flows for TPR and TPO, respectively. The outlet of DRIFT reactor was connected to a quadrupole mass spectrometer (MS, Pfeiffer Vacuum GSD 301) with a vacuum chamber operating at 5×10^-6 mbar to monitor the concentration profiles of H$_2$ and O$_2$. The IR spectra were continuously recorded during the process. The Raman spectra of Fe/Ti oxide powder were obtained at room temperature by a Thermo scientific DXR Raman microscope equipped with a CCD detector and a 780 nm laser prior to and after redox reactions in DRIFT cell and on the fuel cell anode.

The resistivity of the Fe/Ti oxide cylindrical pellets was measured using two-point probe method after (i) reduction in a chemical looping combustion (CLC) reducer reactor at 900° C., (ii) re-oxidation in a quartz tube under 60 sccm O$_2$ at 900° C., and (iii) reduction in a quartz tube under 60 sccm H$_2$ at 900° C.

Fuel Cell Fabrication

Anode-supported solid oxide fuel cells comprising an anode support, an anode interlayer, an electrolyte layer, a cathode interlayer, and a cathode current collector layer were prepared by a tape casting and screen printing approach. The NiO/3YSZ (3 mol % Y$_2$O$_3$ stabilized ZrO$_2$) 65:35 wt % anode support, NiO/8YSZ/ScSZ (10 mol % Sc$_2$O$_3$-1 mol % CeO$_2$ stabilized ZrO$_2$) 63:18.5:18.5 wt % anode interlayer, and ScSZ electrolyte layer were produced by tape casting of the slips. The slips were prepared by (i) weighting the oxide powders in the desired amounts, (ii) dispersing the powders in ethanol, (iii) introducing tape casting additives (i.e., pore former for the anode support, binder and dispersant for all slips), and (iv) ball milling the resulting mixture for 24 h. Upon ball milling, the slips were co-casted and dried for 48 h. The anode/electrolyte tapes were cut into 28 mm diameter discs, and fired at 1400° C. The LSM (La$_{0.8}$Sr$_{0.2}$MnO$_3$)/YSZ 60:40 wt % (Heraeus CL86-8706A) cathode interlayer and the LSM (Heraeus CL86-8706) cathode current collector layer were screen printed on the electrolyte surface with the cathode area of 1.95 cm$^2$ and sintered at 1250 and 1100° C., respectively.

Fuel Cell Testing and Characterization

The anode-supported fuel cell was tested in an in-house constructed steel reactor serving as fuel cell housing and anode current collector equipped with a gas inlet port, a feeding unit for Fe/Ti oxide powder, and a gas outlet port connected to the MS. A SEM micrograph was taken of the SOFC cross-section. The fuel cell was sealed to the reactor with an alumina-based sealant and a layer of Ag conductive adhesive (Heraeus C8728) was applied to the surface of the reactor to enhance the current collection at the anode electrode. An Fe-based metal foil was attached to the cathode current collector layer with the aid of Ag conductive adhesive. The cell was placed inside a furnace, heated to 750° C. at a 3° C./min heating rate, and reduced in Ar/H$_2$ stream (100 sccm, 50 vol % H$_2$).

Voltage-current characteristics and impedance spectrum of the fuel cell were recorded in H$_2$ fuel with a potentiostat and a frequency response analyzer (Solartron analytical 1470E and 1400 CellTest System). Fe/Ti oxide pellets were ground into a fine powder (particle size <100 μm) before feeding it to the solid oxide fuel cell (SOFC). The chemical looping redox reaction was initiated by feeding 2 g of Fe/Ti oxide powder to the anode of the fuel cell operating at 750° C. under a constant load of 500 mV in 50 sccm Ar flow. Following electrochemical oxidation of the Fe/Ti oxide on the anode, the oxidized powder was regenerated through reduction with H$_2$ gas flow. The oxidized Fe/Ti oxide could also be reduced in a chemical looping reducer reactor through direct contact with carbonaceous fuel at 900° C. Current profile of the fuel cell and mass over charge (m/e$^-$) of the gas exhaust were recorded during the redox reactions of Fe/Ti oxide in SOFC stack. The fuel cell was fractured after testing in H$_2$ and Fe/Ti oxide fuels and analyzed with scanning electron microscopy (SEM, Hitachi TM-3000) and energy-dispersive X-ray (EDX, Bruker).

Fuel Cell Structure

The multilayer structure of the fuel cell had a thickness of ca. 830 μm From the SEM imaging, the 740 μm thick Ni/3YSZ anode support layer had a more porous structure and larger Ni and YSZ particles than the 20 μm thick Ni/8YSZ anode interlayer. The particle sizes of Ni and YSZ were estimated from the SEM to be around 4 and 2.5 μm in the anode support, and 2 and 1 μm in the anode interlayer, respectively. The major function of the anode support is to provide the mechanical strength for the thin anode interlayer, where the electrochemical oxidation of gaseous fuel (e.g. $H_2$) occurs, and for the thin electrolyte. The 18 µm ScSZ electrolyte is a dense ion conducting membrane separating the anode and the cathode, avoiding short-circuit. The 50 µm cathode layer consists of a less porous LSM/YSZ cathode interlayer and a more porous LSM cathode current collector layer. Porosity of the layers was determined from Archimedes method and pore-sizes were estimated from SEM micrographs. The volumetric three phase boundary (TPB) length for gaseous fuel was estimated from a mathematical model for the anode support and anode interlayer and TPB length for the solid fuel was obtained from the sum of Ni (electronic conductive phase) and YSZ (ionic conductive phase) interfaces only on the anode support surface. The parameters needed for TPB calculations were obtained from the cross-sectional and surface SEM micrographs of the fuel cell. These results are shown in Table 3.

TABLE 3

Physical properties of the fuel cell

| Component | Pore size (µm) | Porosity | $vL_{TPB}$ (m/m3) |
|---|---|---|---|
| Anode support surface for solid fuel | — | — | $3.3 \times 10^{11}$ |
| Anode support for gaseous fuel | 0.5-5.5 | 42% | $3.0 \times 10^{12}$ |
| Anode interlayer for gaseous fuel | 0.25-3.25 | 30% | $7.8 \times 10^{12}$ |

Temperature Programmed Reduction/Oxidation with Infrared Spectroscopy

The results of temperature programmed reduction/oxidation (TPR/TPO) along with IR absorbance intensity of metal-oxygen (M-O) band of Fe/Ti oxide at 800 $cm^{-1}$ were obtained. The M-O intensities were obtained from IR spectra. The results showed that the decrease in $H_2$ concentration began at 400° C. The absorbance intensity of M-O band decreased along with hydrogen consumption, reflecting reduction of the Fe/Ti oxide. Reduction temperature supported iron oxide is known to be higher than that of pure iron oxide due to the interaction of iron oxide with the support. Reduction temperature has also been found to increase with heating rate and the amount of sample.

Oxygen consumption, obtained from a TPO profile, showed that Fe/Ti oxide was gradually oxidized with increasing temperature while the M-O intensity exhibited a sharp increase at temperatures above 220° C. These observations suggested that the oxidation occurred on the surface of the Fe/Ti oxide particle first and then moved inward, following the shrinking core model. Although the DRIFT study of gas phase oxidation of Fe/Ti oxide may not entirely emulate electrochemical oxidation, both oxidation and electrochemical oxidation are expected to involve inward migration and diffusion of the oxygen anion. In contrast, the TPR (i.e., $H_2$ concentration) profile in parallel to the M-O intensity profile suggested that the reduction could follow a progressive conversion mode which does not produce a drastic boundary between the oxidized and reduced region inside of the Fe/Ti oxide particle.

IR absorbance spectra of the Fe/Ti oxide was recorded during TPR and TPO. A decrease in the intensity of M-O band at 1000-600 $cm^{-1}$ range during TPR indicates the depletion of M-O bands. This change was observed in obtained difference spectra. The difference spectra exhibited a broad positive band during TPO revealing regeneration of M-O band through re-oxidation of Fe/Ti oxide powder.

Resistivity

Table 4 lists the resistivity of the Fe/Ti oxide pellets and the fuel cell anode surface. Fe/Ti oxide pellets possess low resistivity after reduction in pure $H_2$ flow at 900° C. The resistivity of reduced Fe/Ti oxide pellets and the Ni/YSZ anode surface are in the same range. As expected, the resistivity of the Fe/Ti oxide pellet significantly increased after oxidation in pure $O_2$ flow at 900° C. The low resistivity (i.e., high electrical conductivity) of the reduced pellet could play a significant role in ability of the oxygen carrier to conduct the electron from the electrochemical oxidation site to the anode surface.

TABLE 4

Physical properties of the fuel cell

| Sample | Condition | Resistivity ($\Omega \cdot$ cm) |
|---|---|---|
| Reduced Fe/Ti oxide pellet | Reduced in external reducer at 900 deg C. | 16.5 |
| Oxidized Fe/Ti oxide pellet | Oxidized in quartz tube under 60 sccm O2 at 900 deg C. | $1.2 \times 10^7$ |
| Reduced Fe/Ti oxide pellet | Reduced in quartz tube under 60 sccm H2 at 900 deg C. | 2.4 |
| Anode surface | Reduced in SOFC stack under 50 sccm H2 at 750 deg C. | 1-3.5 |

Fuel Cells Performance with $H_2$ and Fe/Ti Oxide Pellets as Fuels

A voltage-current (V-I) curve and impedance spectrum of the fuel cell at 750° C. in Ar/H2 (100 sccm, 50 vol % $H_2$) before introducing Fe/Ti oxide solid fuel was obtained. The fuel cell exhibited an open circuit voltage (OCV) of 1.01 V and a maximum current output of 555 $mA/cm^2$. The low current output resulted from the high ohmic resistance (represented by the high frequency intercept of the impedance arc). This high ohmic resistance can be attributed to the use of low-cost Fe-based alloy for the current collector which exhibited an electrical resistivity of 0.12 $\Omega$.m at room temperature compared to $1 \times 10^{-7}$ $\Omega$.m of precious metals such as platinum. The cathode current collectors chosen can affect the performance of a solid oxide fuel cell. The total resistance of the fuel cell was around 2.8 $\Omega.cm^2$.

The MS intensity profile of Ar ($m/e^-$: 40) and $H_2$ ($m/e^-$: 2) at the exhaust gas and current density profile of the fuel cell operating with $H_2$ fuel and then Fe/Ti oxide under a constant voltage of 500 mV were obtained. Following reduction of the Ni/YSZ anode with Ar/$H_2$ feed, Ar/$H_2$ was switched to a pure Ar flow. The switch led to a decrease in the current from 235 to 10 $mA/cm^2$. The current density decay curve which was produced by residual $H_2$ was obtained, having an integrated area thereunder. The integrated area multiplied by the constant voltage gives the total electrical work (i.e., energy) generated by residual $H_2$ in the anode chamber after gas flow switch.

Introducing 2 g of the reduced Fe/Ti oxide powder onto the fuel cell anode surface under 500 mV (the voltage that gave the maximum powder density of the fuel cell) generated a current density of 195 $mA/cm^2$ and a maximum power density of 97.5 $mW/cm^2$, corresponding to 84% of that in $H_2$ fuel. It is believed that Fe/Ti oxide solid fuel is electrochemically oxidized on the surface of the anode support while hydrogen gaseous fuel is mostly in the anode interlayer. The three phase boundary (TPB) available in the interlayer for $H_2$ gaseous fuel was larger than that on the surface of the anode support for Fe/Ti oxide solid fuel. TPBs are reaction sites where ions, electrons and chemical species (gas or solid) meet for electrochemical reaction. The volumetric TPB lengths are provided above. The TPB of the anode surface available for Fe/Ti oxide oxidation is about 24 times smaller than that of the anode interlayer for $H_2$ oxidation and yet resulted in a maximum power comparable to 84% of maximum power in $H_2$.

Figure 7:
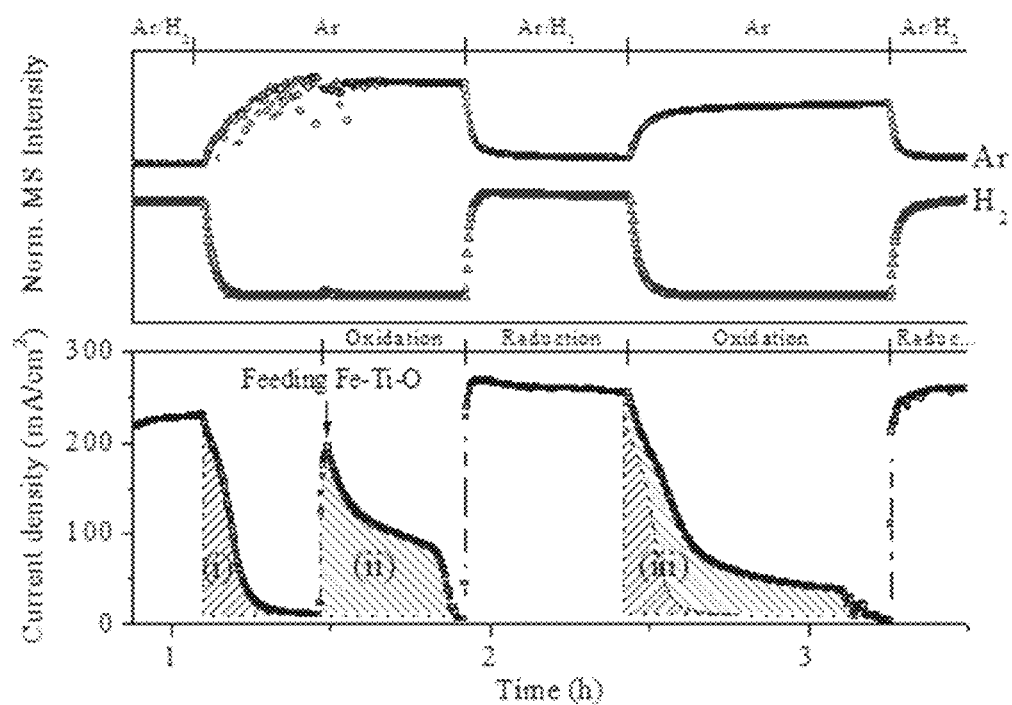
FIG. 7 is a graph showing the concentration profile (MS intensity) of effluent gas and the current density profile of a solid oxide fuel cell under a constant load of 500 mV using $H_2$ and Fe/Ti oxide fuels at 750° C.; the shaded areas show the integrated area of the current produced from (i) residual $H_2$ fuel (after stopping the $H_2$ flow); (ii) Fe/Ti oxide fuel; and (iii) residual $H_2$ (first shading; 'forward slash' shading) and Fe/Ti oxide (second shading; 'backward slash' shading) fuels together.

With reference to FIG. 7, the electricity generation from Fe/Ti oxide indicates that $O^{2-}$ on the anode support surface can reach the reduced Fe/Ti oxide particles for electrochemical oxidation to generate electrons which can be transported back to the anode support surface. The current density was gradually declined as the reduced Fe/Ti oxide was getting electrochemically oxidized. Flowing $Ar/H_2$ for 30 min regenerated the oxidized Fe/Ti oxide which could be further electrochemically oxidized to produce electricity.

Figure 8:
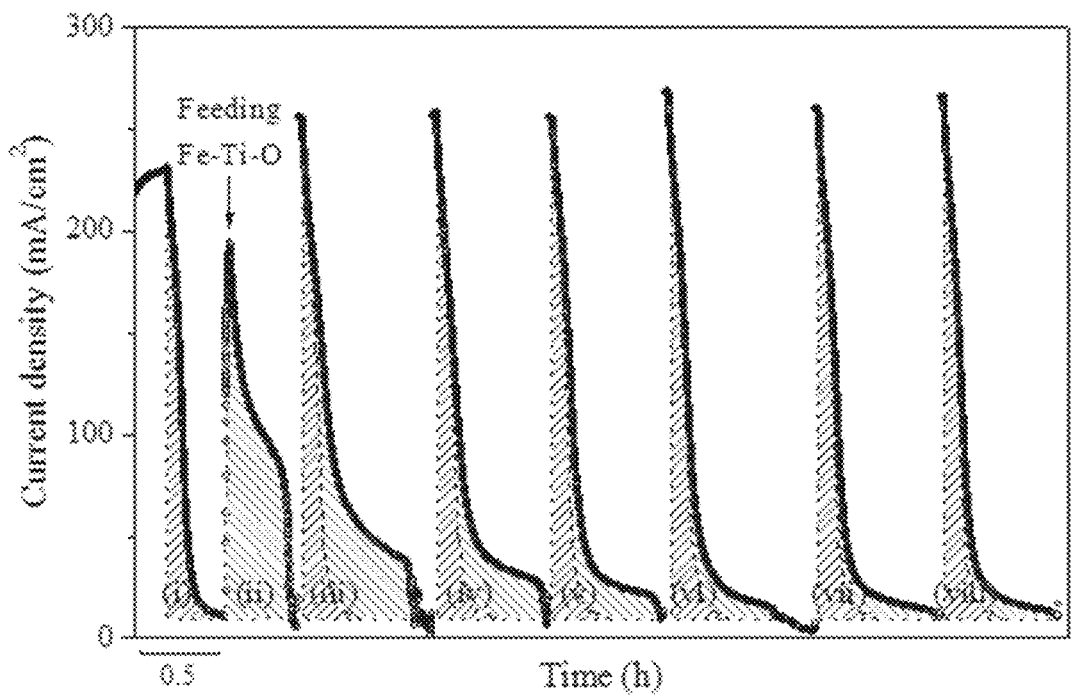
FIG. 8 is a graph showing the current profile of a solid oxide fuel cell under a constant load of 500 mV using $H_2$ and Fe/Ti oxide fuels at 750° C.; the shaded areas show the integrated area of the current peak produced from (i) residual $H_2$ fuel (after stopping the $H_2$ flow); (ii) Fe/Ti oxide fuel; and (iii) to (viii) residual $H_2$ (first shadings; 'forward slash' shadings) and Fe/Ti oxide (second shadings; 'backward slash' shadings) together.

FIG. 8 shows the current profile of the fuel cell operating with cycling $H_2$ and Fe/Ti oxide. Each cycle involved a reduction step with $H_2$ and subsequent switching to Ar flow for initiating electrochemical oxidation of Fe/Ti oxide. The Fe/Ti oxide reduction steps with $H_2$, as in FIG. 7, are not shown in FIG. 8. The current profile of FIG. 8, which reflects the kinetics of electrochemical oxidation of Fe/Ti oxide, resembles the chemical oxidation profile of a similar material in a TGA study showing iron oxide conversion as a function of time.

Figure 9:
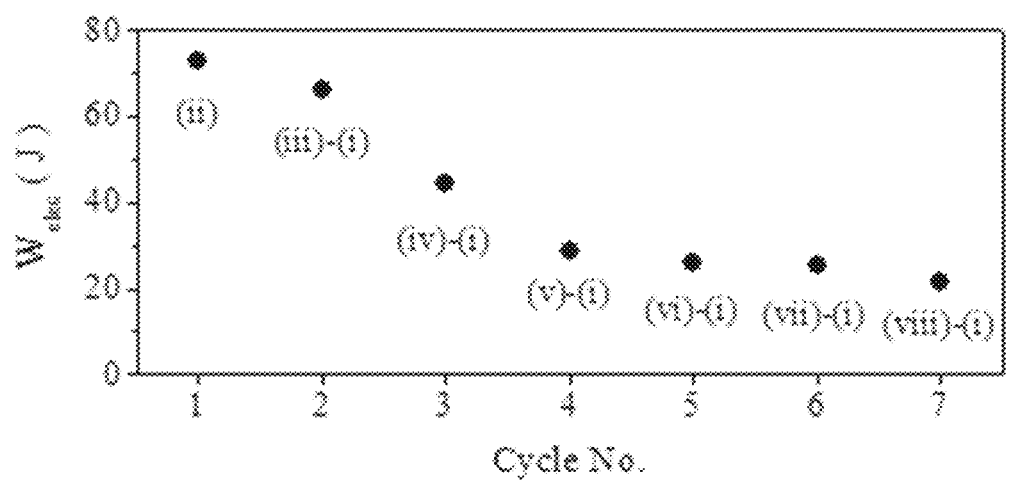
FIG. 9 is a graph showing the electrical work generated by a solid oxide fuel cell using reduced Fe/Ti oxide as fuel at 750° C. in Ar; using FIG. 8 data, the electrical work produced during the first cycle was calculated from multiplying the integrated area of the current peak produced from oxidation of Fe/Ti oxide by constant voltage ($W_{elec}=E_{const}\int I\,dt$); the electrical work for the subsequent cycles was estimated by subtraction of the $H_2$ contribution (shaded area (i) in FIG. 8) from the total integrated area (shaded areas (iii) to (viii) from FIG. 8).

FIG. 9 shows the electrical work produced from oxidation of Fe/Ti oxide during each cycle of FIG. 8. The operation of the fuel cell using Fe/Ti oxide powder at a constant load of 500 mV produced an electrical work of 73.2 J for the first cycle, corresponding to oxidation of 0.5 mmol of $Fe^0$ to $Fe^{3+}$. The conversion of $Fe^0$ to $Fe^{3+}$ was estimated to be 18.8% for the first cycle and this value was decreased for the subsequent cycles and then leveled off. The electrical work was decreased from cycle 1 to 4 and then remained nearly constant. The decrease in electrical work generation after the first cycle can be attributed to the insufficient reduction of Fe/Ti oxide back to the initial reduced state which was produced from reduction in $H_2$ at 900° C. and cooling down to room temperature. Insufficient reduction also resulted from the operation of the fuel cell under the constant load during the reduction in $H_2$, which provides $O^{2-}$ anions to the anode side. The decrease in electrical work is not likely to be a result of deactivation of Fe/Ti oxide since the ability of Fe/Ti oxide to retain reactivity for more than 100 cycles has been elsewhere reported for a conventional chemical looping process. The low stable electricity generation after the first few cycles indicated the extent of Fe/Ti oxide reduction and electrochemical oxidation was achieved at the same level.

Thermodynamic analysis showed that increasing the temperature and hydrogen mole fraction increased the extent of conversion of $Fe_2O_3/Fe_3O_4$ to Fe/FeO. The extent of the reduction can be increased by increasing reduction time. The reducer reactor for Fe/Ti oxide for a typical chemical looping process usually operates at 900° C. At this temperature, the Ni/YSZ anode supported cell is expected to exhibit a significantly higher electricity generation than that at 750° C. resulting in higher electrical work generation.

Optical microscope (OM) images, SEM images, and EDX mappings were recorded after the test. The images were taken from two different spots on the anode surface, (a) the center of the anode without deposited Fe/Ti oxide, and (b) the near edge of the anode with deposited Fe/Ti oxide. The OM and SEM images revealed that the central part of the anode support surface, which was right below the gas inlet tube, contained fewer Fe/Ti oxide particles than the rest of the anode region. The TPBs for solid fuel are the Ni (electronic conductive phase) and YSZ (ionic conductive phase) interface which were determined on the EDX mapping of the clean fuel cell anode surface. Fe/Ti oxide particles were found to have adhered onto the TPBs.

Various modifications and alterations that do not depart from the scope and spirit of this invention will become apparent to those skilled in the art. This invention is not to be duly limited to the illustrative embodiments set forth herein.

What is claimed is:

1. A direct-electrochemical-oxidation fuel cell for generating electrical energy comprising:
   a cathode provided with an electrochemical-reduction catalyst that promotes formation of oxygen ions from an oxygen-containing source at the cathode;
   a solid-state electrolyte disposed to transmit the oxygen ions from the cathode to a solid-state anode;
   the solid-state anode provided with an electrochemical-oxidation catalyst that promotes direct electrochemical oxidation of a solid-state reduced metal in the presence of the oxygen ions to produce electrical energy and a solid-state reducible metal oxide; and
   an external reducer for converting said solid-state reducible metal oxide back to the solid-state reduced metal.

2. The fuel cell of claim 1, wherein electricity is generated by direct electrochemical oxidation at the solid-state anode according to the reaction:

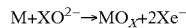

$$M + XO^{2-} \rightarrow MO_X + 2Xe^-$$

where M is the solid-state reduced metal and is a transition metal, where $MO_x$ is a solid-state reducible metal oxide, and where X is a number from 0.1 to 3.

3. The fuel cell of claim 2, wherein M is a metal selected from the group consisting of Fe, Cu, Co, Ni, Ag, Au, and alloys thereof.

4. The fuel cell of claim 3, wherein M is Fe.

5. The fuel cell of claim 2, wherein X is a number from 1 to 3.

6. The fuel cell of claim 1, wherein said solid-state reduced metal is distributed in a reduced pellet having low resistivity.

7. The fuel cell of claim 1, wherein said cathode comprises a cathode interlayer and a cathode current collector layer, and wherein said solid-state anode comprises an anode interlayer and an anode support layer.

8. The fuel cell of claim 1, wherein said solid-state anode comprises an additional impregnation of a catalyst component, the additional impregnation being selected from the group consisting of Ba, Sc, Th, Y, Ce, Gd, Sm, La, Sr, Co, and Fe ions, and combinations thereof.

9. A method of operating the direct-electrochemical-oxidation fuel cell of claim 1 comprising the steps of:
   oxidizing the solid-state reduced metal in the presence of oxygen ions through direct-electrochemical-oxidation to obtain a solid-state reducible metal oxide and
   reducing the solid-state reducible metal oxide to obtain the solid-state reduced metal.

10. The method of claim 9, further comprising the steps of allowing the cathode provided with the electrochemical-reduction catalyst to form oxygen ions from the oxygen-containing source at the cathode and allowing the electrolyte to transmit the oxygen ions from the cathode to the solid-state anode, wherein the step of oxidizing is achieved by the solid-state anode provided with the electrochemical-oxidation catalyst and results in the production of electrical energy.

11. The method of claim 9, further comprising the step of supplying the solid-state reducible metal oxide to the external reducer, wherein the step of reducing occurs in the external reducer.

12. The method of claim 11, further comprising the step of providing the solid-state reduced metal to the direct-electrochemical-oxidation fuel cell after said step of reducing.

13. The method of claim 11, wherein said step of reducing occurs in the presence of a carbonaceous fuel.

14. The method of claim 9, wherein said step of reducing occurs by supplying hydrogen to the solid-state reducible metal oxide.

15. The method of claim 9, wherein said step of reducing occurs by supplying electrical energy to the direct-electrochemical-oxidation fuel cell.

16. The method of claim 10, wherein the rate of direct-electrochemical-oxidation of the solid state reduced metal is accelerated by providing an additional catalyst on the surface of the anode.

17. The method of claim 10, wherein the rate of direct-electrochemical-oxidation of the solid state reduced metal is accelerated by incorporating a catalyst with the solid state reduced metal.

* * * * *